United States Patent [19]
Goldberg et al.

[11] Patent Number: 5,347,509
[45] Date of Patent: Sep. 13, 1994

[54] RECOVERING DIGITAL INFORMATION REPRESENTED BY MULTI-DIMENSIONALLY ENCODED SYMBOLS CARRIED BY AN INFORMATION STORAGE MEDIUM

[75] Inventors: Paul R. Goldberg, Palo Alto; Douglas E. Mandell, San Francisco; Martin J. Richards, Redwood City, all of Calif.

[73] Assignee: Dolby Laboratories Licensing Corporation, San Francisco, Calif.

[21] Appl. No.: 962,217

[22] PCT Filed: Jun. 4, 1992

[86] PCT No.: PCT/US92/04778
§ 371 Date: Jan. 13, 1993
§ 102(e) Date:

[51] Int. Cl.⁵ .......................... G11B 7/26; G11B 5/09
[52] U.S. Cl. .................... 369/275.3; 369/47; 369/59; 360/32; 360/39
[58] Field of Search .............. 369/275.3, 47, 59; 360/36.2, 39, 32

[56] References Cited

U.S. PATENT DOCUMENTS

| | | | |
|---|---|---|---|
| 4,141,039 | 2/1979 | Yamamoto | 358/127 |
| 4,600,280 | 7/1986 | Clark | 352/37 |
| 4,659,198 | 4/1987 | Beauviala et al. | 352/92 |
| 4,755,889 | 7/1988 | Schwartz | 360/32 |
| 4,760,247 | 7/1988 | Keane et al. | 235/454 |
| 4,786,792 | 11/1988 | Pierce et al. | 235/456 |
| 4,862,292 | 8/1989 | Enari et al. | 360/32 |
| 4,874,936 | 10/1989 | Chandler et al. | 235/494 |

FOREIGN PATENT DOCUMENTS

0130391 1/1985 European Pat. Off.
9105335 4/1991 PCT Int'l Appl.

Primary Examiner—Paul M. Dzierzynski
Assistant Examiner—Kim-Kwok Chu
Attorney, Agent, or Firm—Thomas A. Gallagher; David N. Lathrop

[57] ABSTRACT

The invention relates generally to media carrying symbols representing digital information, the recovery from media of symbols representing digital information and the establishment of the digital information represented by such symbols. While the present invention has many applications, it is more particularly described in connection with preferred embodiments in which the symbols are recovered from and carried by tape- and disk-based storage media in which the symbols are arranged in spiral, concentric, parallel or linear tracks.

22 Claims, 5 Drawing Sheets

FIG. 6

RECOVERING DIGITAL INFORMATION REPRESENTED BY MULTI-DIMENSIONALLY ENCODED SYMBOLS CARRIED BY AN INFORMATION STORAGE MEDIUM

DESCRIPTION

1. Technical Field

The present invention relates generally to media carrying symbols representing digital information, the recovery from media of symbols representing digital information and the establishment of the digital information represented by such symbols. While the present invention has many applications, it is more particularly described in connection with preferred embodiments in which the symbols are recovered from and carried by tape- and disk-based storage media in which the symbols are arranged in spiral, concentric, parallel or linear tracks.

2. Background Art

The expanding use of digital computers and digital processing has heightened interest in finding methods and apparatuses for more efficient retrieval of digital information from storage media. More efficient information storage retrieval includes advances in the art such as increased information storage capacities, reduced information access times, and reduced apparatus and medium costs.

Commonly used storage techniques utilize magnetic and laser-optical technologies to store and retrieve digital information on tape- and disk-based storage media. The digital information is usually arranged on the medium in linear sequences or "tracks" of binary-valued symbols. Magnetic tape, for example, may store digital information as magnetic flux changes within one or more tracks arranged either along the length of the tape or diagonally across the width of the tape. A magnetic disk commonly stores digital information as magnetic flux changes within tracks arranged in concentric circles about the center of the disk. A laser-optical disk commonly stores digital information as reflective spots, either raised or flush with the surrounding reflective area of the disk, arranged within a track which spirals in toward the center of the disk.

The information storage capacity of a storage medium is established by the size of the medium and the density of the symbols carried by the medium. The density is established by the spacing between adjacent symbols within a track and by the spacing between adjacent tracks. For optical storage media having only one spiral-shaped track, the concept of adjacent tracks is understood to mean adjacent turns of the spiral. The "width" of a track is distinct from but related to the spacing between adjacent tracks; the width represents the dimension across a track transverse to its length. In most applications, the track width is smaller than the spacing between adjacent tracks thereby providing a "guard band" between adjacent tracks which is not used to store information.

Increases in information storage capacities have generally been achieved by decreasing the spacing between symbols arranged within a track and decreasing the spacing between adjacent tracks. Thus, high-capacity storage media tend to comprise a very large number of very narrow tracks spaced closely together.

Such increases in information storage capacity often increase the cost of the apparatus used to store and retrieve information because high-capacity storage media of this type imposes very demanding requirements upon the accuracy and speed of electro-mechanical apparatuses used to store and retrieve information. When an apparatus is called upon to store or retrieve information on a medium, an electro-mechanical actuator must move a magnetic "head" or optical "pickup" sensor accurately enough to position the sensor within the width of a particular track. This becomes more difficult as the track width becomes narrower.

In addition, such increases in information storage capacity frequently result in longer access times. The time required to accurately position a sensor, called the "seek time," is adversely affected by a number of factors including the distance or number of tracks over which the head must move, the accuracy with which the sensor must be positioned, and the mass of the sensor. It is difficult to achieve low seek times for high-capacity magnetic media because of the large number of closely spaced tracks, but it is especially difficult to achieve low seek times for laseroptical media having an even greater number of tracks and a much closer track spacing.

Furthermore, a laser-optical pickup has considerably more mass than a magnetic head because it typically comprises a laser, a lens system, one or more photodetectors, and a diffraction grating. The larger mass makes it more difficult to move the pickup quickly and accurately from one track to another.

Unfortunately, an increase in storage density does not always obtain an equivalent increase in information storage capacity because some storage space must be used to store control and timing information or "flags" required to compensate for consequences of the higher storage density.

Flags include information which (1) establish the relationship between time and distance across a storage medium, (2) identify segments of digital information, and (3) establish structures in which digital information may be stored. Some examples of these flags include clock pulses or timing information, track indexes, and track location information.

Track location information is used in closed-loop servo position controls. Closed-loop servo controls are necessary because certain factors such as vibration and thermal expansion/contraction of the medium can displace the absolute location of a track by a distance which is on the order of the spacing between tracks. In magnetic media, track location information is often stored as "servo" information between blocks of symbols, stored on a separate disk dedicated to servo information which is mechanically linked to other disks, or stored on a disk adjacent to each of the tracks. In laser-optical media, closed-loop servo controls sometimes utilize the reflective surface of the guard bands between tracks in addition to track "index" information stored within the tracks.

Accurate timing information is needed to accurately recover symbols within a track and prior art systems attempt to establish accurate timing information at the time that the symbols are detected on a storage medium. The correct interpretation of a symbol requires that the symbol recovery process accurately establish where each symbol is stored and what value each symbol represents. The location of each symbol is determined by the precise time at which it was written to the medium, but time instability or "jitter" in both the writing and reading processes make it difficult to establish this timing information accurately. Jitter creates uncertainty in the value represented by digital symbols similar to the uncertainty created by noise.

Jitter is caused by many factors including spped variations in the storage medium transport mechanism such as tape "wow" and "flutter" or disk rotational speed variations, and deviations in the "clock" or timing signal used to control writing to and reading from the medium. Jitter in apparatuses such as home video cassette-tape recorders can also be caused by additional factors such as tape surface irregularities at the tape/head interface, shock waves traveling along the tape surface generated by rotating heads striking the tape surface, and tape transport variations caused by the tape capstan servo attempting to track or follow the video signal.

Generally the cost is too high to implement a storage medium transport mechanism stable enough to eliminate jitter, but a sufficiently stable transport can reduce jitter enough to permit compensation for the remaining jitter. Several methods have been used in the art to compensate for jitter but these methods are either not entirely effective or they reduce information storage capacity. One method confines transitions between binary-valued symbols to a multiple of a time period which is long compared to the time uncertainty created by jitter. This method increases the spacing between symbols and reduces information storage density.

A second method stores clock pulses along with the symbols stored on the medium but this greatly reduces the information storage capacity because it requires a significant amount of space to store the clock pulses.

A third method generates timing information from a phase-locked loop (PLL) circuit comprising a voltage-controlled oscillator which adjusts its frequency to minimize phase errors with the transitions between opposite binary-valued symbols recovered from the medium. When no transitions occur, the oscillator "flywheels" at the last known frequency and phase until it can rephase itself at a subsequent transition. This method does not incur any overhead to store clock pulses, but it does not work well for long sequences of symbols which do not have transitions, that is, for long sequences of symbols having the same value.

A fourth method also uses a PLL but encodes the stored information according to a "channel code" which restricts the symbol sequence length which may occur without a transition. The accuracy of the clock generated by the PLL is improved but overhead is incurred to store the channel code.

The increase in storage density and reduction in information access time combine to impose higher data rates upon the information retrieval process. In particular, the symbol recovery process must be able to recover timing information and correct symbol errors as the symbols are detected on the medium. As information storage capacity increases and access times decrease, it becomes more difficult to recover timing information because the amount of information to process increases and the amount of time available to perform these functions decreases.

Thus, high-capacity digital storage media such as magnetic tape or disk or laser-optical disk comprise a large number of narrow, closely spaced tracks. The efficient retrieval of information from such storage media requires: (1) an accurate electro-mechanical apparatus to control position of the sensor; (2) a stable transport mechanism to minimize jitter; (3) storage overhead to store flags such as track position information and clock recovery information; and (4) fast symbol recovery processes to provide timing information in order to recover symbols at higher data rates.

DISCLOSURE OF INVENTION

It is an object of the present invention to reduce requirements imposed upon the symbol recovery process which must be performed as symbols are received from a storage medium.

It is another object of the present invention to provide for increased net capacity of a storage medium by reducing the overhead required to store information used only to recover data timing or clock information.

It is yet another object of the present invention to provide for a high-capacity information storage medium which imposes lower requirements upon the accuracy of electro-mechanical actuators controlling the position of heads and pickups.

It is a further object of the present invention to provide for a high-capacity information storage medium which imposes lower requirements upon the speed stability of electro-mechanical storage medium transport mechanisms.

In its broadest aspects, the present invention contemplates the use of any storage medium which can carry any differentiable symbols capable of representing digital information and capable of being carried by a storage medium in two or more dimensions, or capable of being reconstructed from a storage medium into a representation of two or more dimensions. Although the present invention may be applied to higher-order dimensional media, it is described below more particularly for storage media referred to herein as two-dimensional storage media. Examples of two-dimensional storage media include magnetic storage media such as tape, paper, and disks, and optical storage media such as paper, disks, and film.

In accordance with the teachings of the present invention, an apparatus for recovering digital symbols from a storage medium receives a signal representing the symbols, samples the received signal, derives an image representation of the symbols from the samples, and recovers from the image representation the values represented by the symbols.

Also in accordance with the teachings of the present invention, an information storage medium comprises one or more tracks of symbols, each track carrying two or more symbols across its width, wherein the symbols are encoded two-dimensionally within each of the tracks.

Terms such as "encoded two-dimensionally" or "two-dimensional encoding," as used herein with respect to symbols, mean that the information represented by the symbols can be determined from only a differentiable characteristic intrinsic to the symbols and the two-dimensional positioning of the symbols relative to one another or to some other reference on the medium. There is no need for any flag relating to the symbols or their positions with respect to the medium itself. Examples of a differentiable characteristic intrinsic to the symbols include optical reflectivity or transmissivity, shape, color, size, and orientation. The combination of a differentiable characteristic and relative position, or a locational characteristic, is referred to herein as a differentiable-locational characteristic.

The present invention is particularly advantageous for use with practical storage media in which the position or location and the differentiable characteristics of the symbols are subject to statistical variations, i.e., they are not uniform. Variations in differentiable-locational characteristics can be caused by distortions in the medium itself, or by inconsistencies in the application of the symbols to the medium.

Signals representing symbols carried by a two-dimensional storage medium are oversampled in at least one dimension. Oversampling is sampling at a rate higher than the Nyquist sampling rate. In preferred embodiments, two adjacent symbols constitute a complete cycle of data; therefore, sampling at a rate higher than the Nyquist rate means sampling at a rate higher than exactly once per symbol. Symbols are oversampled for every dimension in which location and/or timing information for the symbols is uncertain. This is discussed more fully below.

A representation of the symbols carried by the storage medium is derived from the samples produced by sampling the symbols in two dimensions. This representation of the symbols carried by the storage medium constitutes a two-dimensional image representation which conveys the differentiable-locational characteristics of the symbols carried by the storage medium.

Filtering in two dimensions, in the nature of reconstruction filtering or image enhancement, may be applied as needed to improve the resolution of the two-dimensional image representation so that it is suitable for locating the symbols and determining, within a desired accuracy, the digital value of the digital information which they represent. Although reconstruction filtering may be important to practical implementations of apparatuses embodying the present invention, such filtering does not form part of the present invention and is not discussed in detail herein.

The digital value of the digital information represented by each symbol, referred to herein as the "symbol value," is recovered from the image representation by examining differentiable-locational characteristics of the image representation. Differentiable characteristics are compared to one or more references; for example, optical characteristics may be compared to light transmissivity or reflectivity thresholds. Locational characteristics are compared to one or more references such as, for example, a set of anticipated relative symbol locations.

The present invention allows the recovery of a densely packed array of small symbols carried by the storage medium and the determination of the digital information represented by the symbols entirely by electro-optical and electronic means without requiring precise positioning techniques. The symbols carried by the storage medium need only be within the sensing range of the sensing arrangement.

There are no requirements for close alignment between the storage medium and the sensing arrangement nor are there requirements for close synchronization, clocking or tracking of the storage medium. No timing information or flags need be carried by the storage medium because symbol recovery is dependent upon establishing the distance between a symbol and a known reference or establishing the distance between two symbols. Accurate timing information is derived from a comparison between the established symbol distances and expected distances known in advance. This process of deriving accurate timing information is referred to herein as "clock recovery" or "time base correction". In addition to simplifying the process of symbol recovery, the absence of clock or timing information makes more information carrying area of the storage medium available for other purposes.

The present invention is described more particularly in connection with embodiments wherein the storage medium is an optical disk. It should be appreciated that the features and teachings of the present invention set forth below with respect to optical disk storage media are directly applicable to optical media having other formats such as tape or sheets, and which utilize optical markings applied by photographic, printing, magneto-optic, phase change, dye polymer, ablative, injection molded plastic, and other similar marking technologies.

In the preferred embodiment for an optical disk, symbols representing digital information are carried by the disk in a series of discrete segments in the form of two-dimensional blocks of symbols. In principle, such segments may be of any convenient length or size. The information is read by oversampling the blocks in two dimensions, deriving a two-dimensional image representation of each block of symbols, and determining the digital value represented by each symbol in the block.

In accordance with the basic principles of the present invention, there are no stringent requirements for any special alignment or synchronization of the disk with respect to the optical sensor, nor are there requirements for clocking or tracking information on the disk. The image representations of the blocks of symbols are two-dimensional image representations which permit the determination of digital values represented by the symbols to be made on the basis of the symbol's optical characteristics and location without regard to timing or flags.

In one embodiment for optical disks, the blocks of symbols are generally of rectangular shape. Each of the blocks may have one or more alignment patterns or references to assist locating the symbols, but the alignment patterns or references are not necessary. The use of alignment patterns or references may allow determining the location of the symbols using lower amounts of processing power.

The terms "alignment pattern" and "pattern" are used herein to mean any reference that can be used to assist aligning and/or locating the information-carrying symbols; they should not be understood to include any limitation implied by the word "pattern."

If alignment patterns are employed, preferably they should have autocorrelation properties such that low autocorrelation values result when the pattern is not congruent with itself. A cross-multiplied Barker code may be used. In one embodiment, an alignment pattern is placed in each corner of each block of symbols. For simplicity in processing as described below, the four alignment patterns are identical; in principle, they may differ from one another.

In one embodiment for optical disks, the symbols are located relative to one another in such a manner that their centers define the intersections of a grid formed from the intersection of radial lines passing through the disk center and arcs of concentric circles about the disk center. The present invention does not limit the relative location of the symbols to such a configuration. For example, the symbols may be located in such a manner that their centers define the intersections of an orthogonal grid having equally spaced lines.

In one embodiment of an apparatus for retrieving digital information from a magnetic tape, symbols representing digital information are carried by the tape in a series of parallel tracks running diagonally across the width of the tape. The information is read by sampling the symbols along the length of each track, deriving a two-dimensional image representation, and determining the digital value represented by each symbol in the image.

In accordance with the basic principles of the present invention, there are no stringent requirements for clocking or tracking information on the tape. The image representations of the symbols are two-dimensional image representations which permit the determination of digital values represented by the symbols to be made on the basis of the symbol's magnetic properties and location without regard to timing or flags.

An apparatus according to the present invention may store digital information on and retrieve digital information from conventional recorders such as home video cassette-tape recorders which usually have poor timing stability because the invention depends only upon the bandwidth of the recording and playback mechanism and upon normal tracking accuracy of the head with respect to the signal tracks. It does not require low jitter or long-term stability in tape speed normally required in digital systems.

As mentioned above, the invention is applicable to applications, media and storage techniques other than those of the preferred embodiments. For example, the invention may be employed to store and retrieve information from paper using optically or magnetically differentiable symbols by using electrostatically applied toner or magnetic ink, respectively. Very large amounts of information such as text, music, voice, video images, or digital data could be stored on paper and read simply and inexpensively using ordinary noncoherent light sources.

MODES FOR CARRYING OUT THE INVENTION

A. Medium

Figures 1A, 1B:
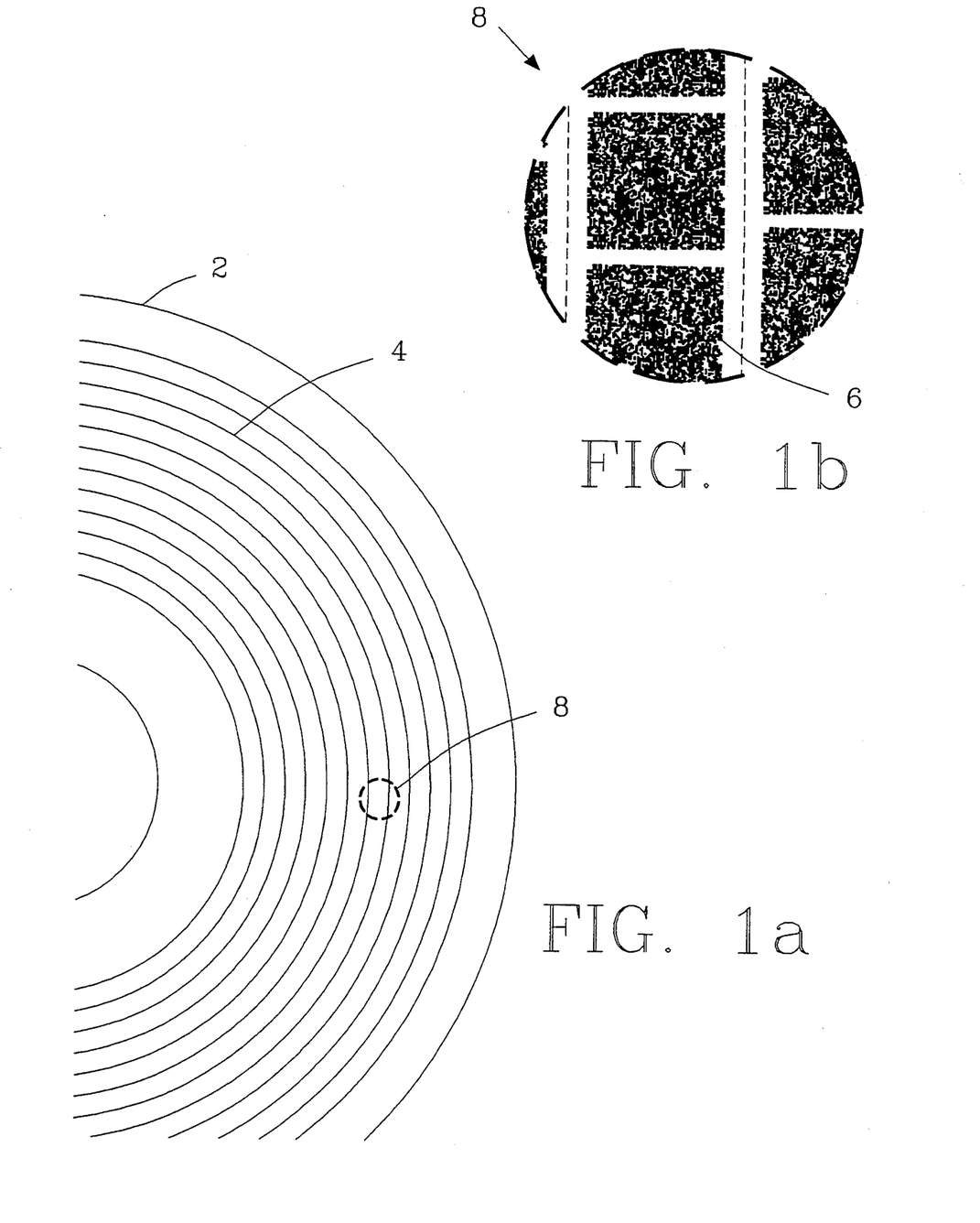
FIG. 1a is an illustration of an optical storage medium in the form of a disk carrying tracks of stored information.
FIG. 1b is a magnified view of a portion of the medium shown in FIG. 1a illustrating symbol blocks according to one aspect of the present invention.

Referring to FIG. 1a of the drawings, a storage medium carrying symbols representing digital information is shown in the form of an optical disk 2. The digital information may be arranged in numerous concentric circular tracks 4 centered about the center of the disk or may be arranged in a single spiral track with a pitch comparable to the spacing between adjacent concentric tracks without departing from the scope of the invention. More particularly, FIG. 1a represents an optical disk, but one aspect of the present invention is applicable to other storage media which lend themselves to two-dimensional oversampling of symbols carried by the media.

Figure 2:
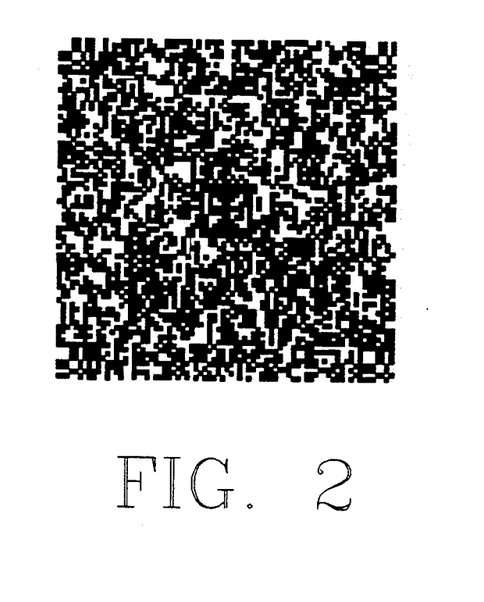
FIG. 2 is a more detailed illustration of symbol block.

FIG. 1b is a magnified view of area 8 shown in FIG. 1a. This magnified view shows two-dimensional arrays or blocks of symbols 6 representing digital information carried in a track 4 on disk 2. FIG. 2 illustrates in more detail a block of symbols.

It should be appreciated that the optical storage medium illustrated in FIGS. 1a and 1b comprises a fewer number of tracks each carrying a greater number of symbols than does prior art optical media of a similar storage capacity.

Each symbol illustrated in the drawing is represented by either a black or a white square. In principle, the symbols may assume any convenient differentiable characteristic and shape which facilitates the storage and/or retrieval of information on the storage medium, but they are represented as black and white squares in the drawings merely for ease of representation. For optical storage applications, it is expected but is not required that the symbols will be implemented as reflective and non-reflective spots essentially circular in shape. For purposes of the following discussion, symbols and other areas on the medium illustrated in the drawings which are black are assumed to represent non-reflective areas, and white symbols and areas are assumed to represent reflective areas.

With respect to the drawings, FIG. 1b shows a white band and dotted line between adjacent tracks. The white band and dotted line are intended only to call attention to the structure of the symbol blocks within tracks. The present invention does not require a specific boundary between tracks; symbol blocks in adjacent tracks may abut one another.

The binary value represented by each type of symbol is arbitrary. For purpose of discussion, black or non-reflective symbols shall represent a value of zero and white or reflective symbols shall represent a value of one.

The number of symbols shown in each block is not critical to the practice of the present invention, but is merely intended to show that it is contemplated many embodiments will utilize blocks comprising 50 to 100 symbols in each dimension.

The size of each symbol is inversely related to the number of symbols which may be carried in a given area. In the absence of all other changes, digital data rates may be increased by reducing the symbol size, but reducing the symbol size may impair the ability to accurately determine the digital information represented by the symbols. For example, smaller symbols are more susceptible to corruption of the medium surface and by focusing errors in the optical sensing arrangement. Furthermore, the smallest usable symbol size is constrained by diffraction effects at the edges of the symbols.

The drawing in FIG. 1b illustrates unused areas or "guard bands" between the symbol blocks. Guard bands are not essential to the present invention; however, as discussed below, they may simplify the process of locating the precise location of each symbol block.

The drawing also illustrates blocks of contiguous symbols located relative to one another in such a manner that the symbol centers define the intersections of a grid formed from the intersection of a set of radial lines passing through the center of the disk and a set of arcs lying along concentric circles centered about the center of the disk. The symbols need not be contiguous and can be arranged according to any convenient pattern which establishes symbol locations relative to one another or to some other locational reference.

It is possible to establish one or more references which may assist in locating the precise center of each symbol; the references may be either extrinsic to the field, or they may comprise one or more symbols within the field. These references are referred to herein as "alignment patterns." Although alignment patterns are not necessary to practice the current invention, they can greatly reduce the amount of processing required to locate the symbols.

An alignment pattern may be located at each of the four corners of each block of symbols. Less than four alignment patterns may be workable, depending on the particular application, the data density carried by the medium, and the processing power of the symbol recovery apparatus. Alternatively, the guard bands adjacent to the edges of the block of symbols may be used as an aid in locating the symbols and determining their digital values.

If used, each of the one or more alignment patterns should comprise an array of symbols having good auto-correlation characteristics. A 7-by-7 array is employed in the embodiment illustrated in the drawings. The autocorrelation characteristics of the alignment pattern are such that a low autocorrelation value results when the pattern is not congruent with itself. A crossmultiplied 7-bit Barker code ($1110010_2$) satisfies the desired autocorrelation characteristics. Preferably, if more than one alignment patter is used, all of the alignment patterns contain the same array of symbols and are located in each corner of the block symbols. In the preferred embodiment, a band of opaque symbols is placed along the two inside edges of the alignment pattern, the alignment pattern and the band of opaque symbols thus forming an 8-by-8 array of symbols.

B. Apparatus

Figure 3:
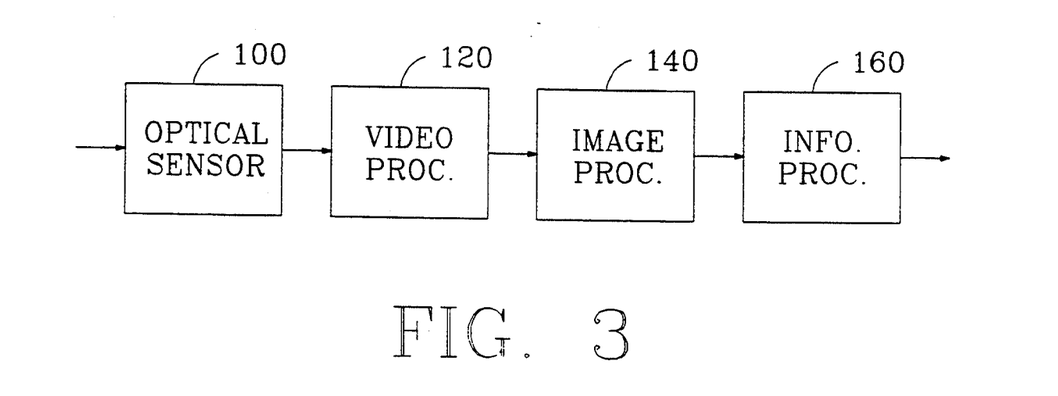
FIG. 3 is a functional block diagram of an apparatus incorporating one aspect of the present invention.

FIG. 3 is a high-level functional block diagram of an apparatus incorporating the preferred embodiment of the present invention. The Optical Sensor 100 optically scans two-dimensionally encoded information carried by an optical-storage medium and generates video signals in response thereto. The Video Processor 120 controls the scanning rate of the Optical Sensor 100 and generates digital signals forming a two-dimensional image representation in response to the video signals. The Image Processor 140 filters the two-dimensional image representation to improve its resolution and generates digital information corresponding to the value of the optically encoded information carried by the optical-storage medium. The Information Processor 160 processes the retrieved digital information according to the application the apparatus is intended to serve.

1. Optical Sensor

Optical Sensor 100 detects the optically differentiable characteristics of the symbols. The specific implementation of the optical sensing arrangement is not critical to the practice of the present invention. Implementations will vary according to the medium and the application. A linear CCD array is generally the preferred optical sensor because of its relatively low cost, small size and ruggedness, but in principle other types of optical scanners can be used subject to requirements for scanning rate and resolution.

The source of illumination is also not critical to the practice of the present invention; however, the illumination source and the optical sensor must operate together to provide two-dimensional oversampling of the optical storage medium surface.

For rotational optical disk media, it is anticipated that the illumination source and the optical sensor are physically attached to a lever or arm driven by an actuator which controls the radial position of the sensing arrangement with respect to the center of the disk. The optical disk is rotated causing the symbols carried on the disk to move relative to the sensing arrangement. The sensing arrangement itself provides sampling in one dimension transverse to the relative motion of the symbols with respect to the sensor. This sampling is referred to herein as horizontal sampling. A sequence of samples by the sensing arrangement as the disk rotates provides for sampling in the a second dimension parallel to the relative motion of the symbols with respect to the sensor, referred to herein as vertical sampling.

For an embodiment utilizing a CCD optical sensor, the symbols are optically oversampled in the horizontal direction by imaging each symbol onto more than one CCD element or pixel, and the symbols are optically oversampled in the vertical direction by reading the CCD array at a rate more than once per symbol as the symbols move relative to the CCD array. The horizontal optical sampling rate is a function of symbol size, optical magnification, and CCD array pixel size. The vertical optical sampling rate is a function of symbol size, disk rotation angular speed, and CCD line scanning rate.

In the present invention, there is no requirement for any fixed relationship between particular symbols and CCD array pixels. For optical disks, for example, as the disk rotates beneath the sensing arrangement, a particular horizontal symbol position in the block of symbols need not be read by the same CCD array pixels. In actual practice, a particular symbol location may not be read by the same CCD array pixels due to tolerances in the sensor positioning mechanism, imprecise centering of the disk on its spindle, and tolerances in the track position on the disk. The track following function of the sensor positioning mechanism need not perform with the same degree of accuracy as that required in prior art mechanisms.

Large errors in sensor positioning can be tolerated by overscanning at the ends of the CCD array to allow the sensor to shift radially and still be within the sensing range or field of view of the optical sensing means.

"Overscanning," which is the scanning of the film beyond the borders of the blocks of symbols, should not be confused with "oversampling," which is the taking of samples at a rate greater than the Nyquist sampling rate.

Although there may be a slight skewing of the lines of symbols on the film relative to the CCD array as a result of disk warpage, such skewing need not be compensated by skewing the CCD array position. This is because the digital information is recovered from the film by deriving a two-dimensional image representation, as described further below.

Vertical optical oversampling is accomplished by scanning the optical sensor more than once per symbol. The scan rate should be chosen so as to keep optical aliasing acceptably low. The vertical optical sampling rate and optical aliasing are functions of the interplay between the optical filtering effect resulting from the relative pixel to symbol apertures and the CCD line scanning rate.

The vertical optical sampling rate need not be as high as the horizontal optical sampling rate because disk rotation tends to "smear" or elongate the symbols, thereby reducing their harmonic information content.

Disk rotation cooperates with the scanning of the CCD array to provide one of the two directions of scanning required by the system. The exact CCD scanning rate may be varied to closely follow short- and long-term variations in disk rotational speed. Although significant variations are unlikely in optical disk applications, the present invention is tolerant of substantially all short- and long-term speed variations that may be encountered for various apparatuses such as magnetic tape transports or hand-scanning of magnetic-stripe media. This aspect of the invention is described below in more detail.

2. Video Processor

Figure 4:
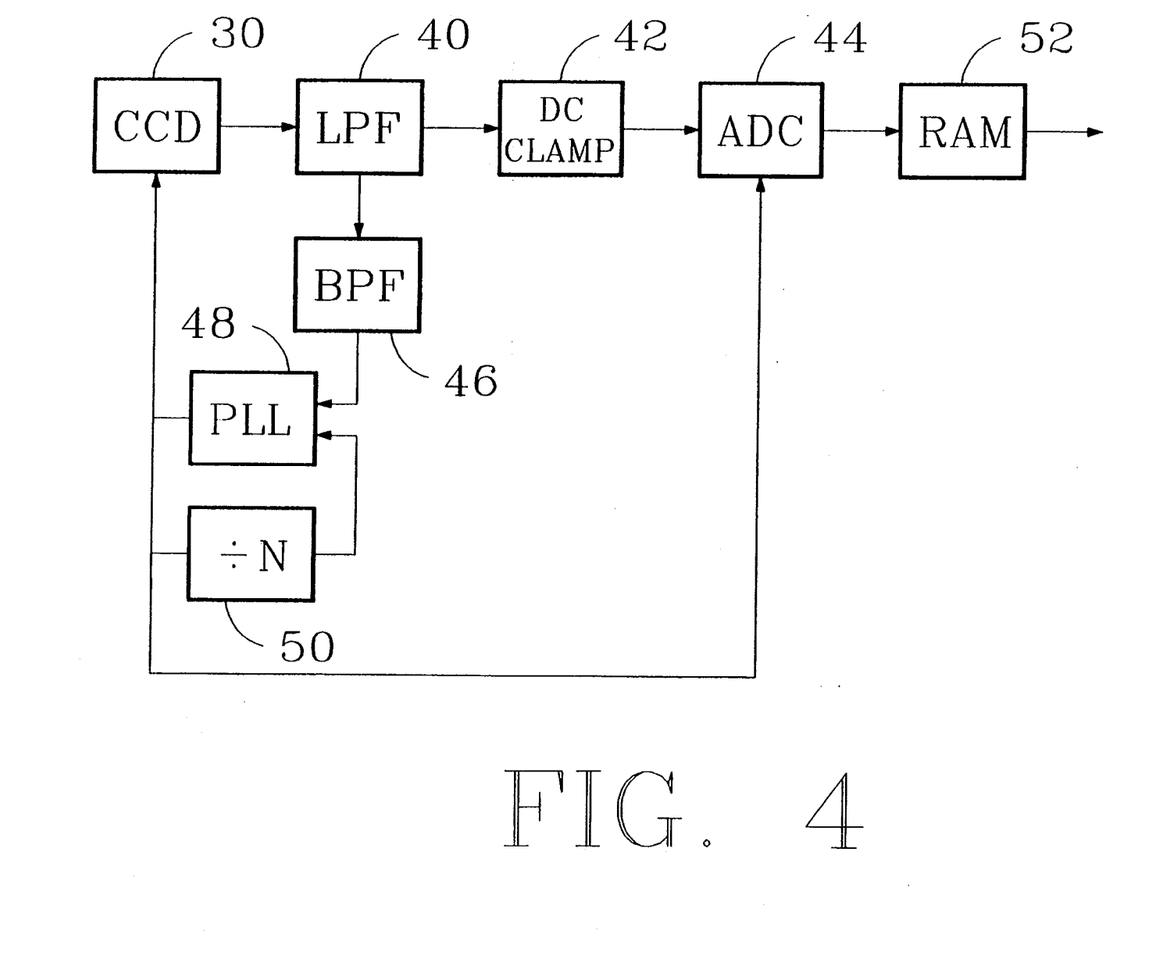
FIG. 4 is a functional block diagram of the Video Processor portion of an apparatus incorporating one aspect of the present invention.

FIG. 4 is a functional block diagram showing the interconnections of the CCD optical sensor with an embodiment of Video Processor 120. The output of the CCD array 30, and hence the output of the Optical Sensor 100, is a wide bandwidth video-like pulse amplitude modulated analog signal. That signal is passed through the anti-aliasing low-pass filter 40, and the black level of the signal is clamped to DC in the DC clamp 42 after every scan in the same manner as that done by a television receiver for a television signal. The CCD array must be over-clocked in order to provide a black-level signal at the end of each scan. The clamped video signal is passed to an 8-bit ADC 44 which electrically samples the optical samples provided by the CCD array 30. The 8-bit samples generated by the ADC 44 are stored in a random-access memory (RAM) 52. The scanned CCD array 30 taken with the disk rotation and the electrical sampling by the ADC 44 provide in the RAM 52 an oversampled digital signal of an image representation in two dimensions of the symbols carried by the optical disk.

The electrical sampling or resampling of the optical samples by the ADC 44 is a practical requirement to transform the optical samples into a form suitable for subsequent processing in the digital domain. The electrical resamples from the ADC 44 express the analog optical sampling information as 256 discrete levels in 8-bit bytes suitable for digital processing.

As mentioned briefly above, the line scanning rate of the CCD array 30 may be varied according to variations in the disk rotation angular speed so that optical scanning is tolerant of short term and long term variations. With a preferred embodiment of the storage medium having guard bands between adjacent symbol blocks, a measure of angular speed is available from the video-like signal generated by the CCD array 30. The dominant low-frequency component of this signal is a signal generated in response to the guard bands. This dominant low-frequency component is a direct measure of the current rotation angular speed of the optical disk.

A variable or programmable clock arrangement for causing the CCD array 30 scan rate and the ADC 44 clock rate to track the disk rotation angular speed is provided by a bandpass filter 46, a phase-locked loop (PLL) comparator 48, and a frequency divider 50. The bandpass filter 46 is centered at the nominal rate at which guard bands pass the optical sensing arrangement. The PLL comparator 48 compares the signal received from filter 46 with a reference signal derived from dividing the frequency of PLL output signal by the frequency divider 50. The output of the PLL 48 is applied as the clocking signal to the CCD array 30 and to the ADC 44. The CCD array and ADC scan rates thus closely follow variations in the optical disk rotation angular speed. As mentioned above, this feature of the invention is especially important for other implementations in which large variations in storage medium transport speed are expected.

By clocking the CCD array 30 and the ADC 44 from the same programmable clock, the respective sampling functions run synchronously with each other which tends to suppress the generation of undesirable artifacts that may otherwise result from non-synchronous operation.

3. Image Processor

Figure 5:
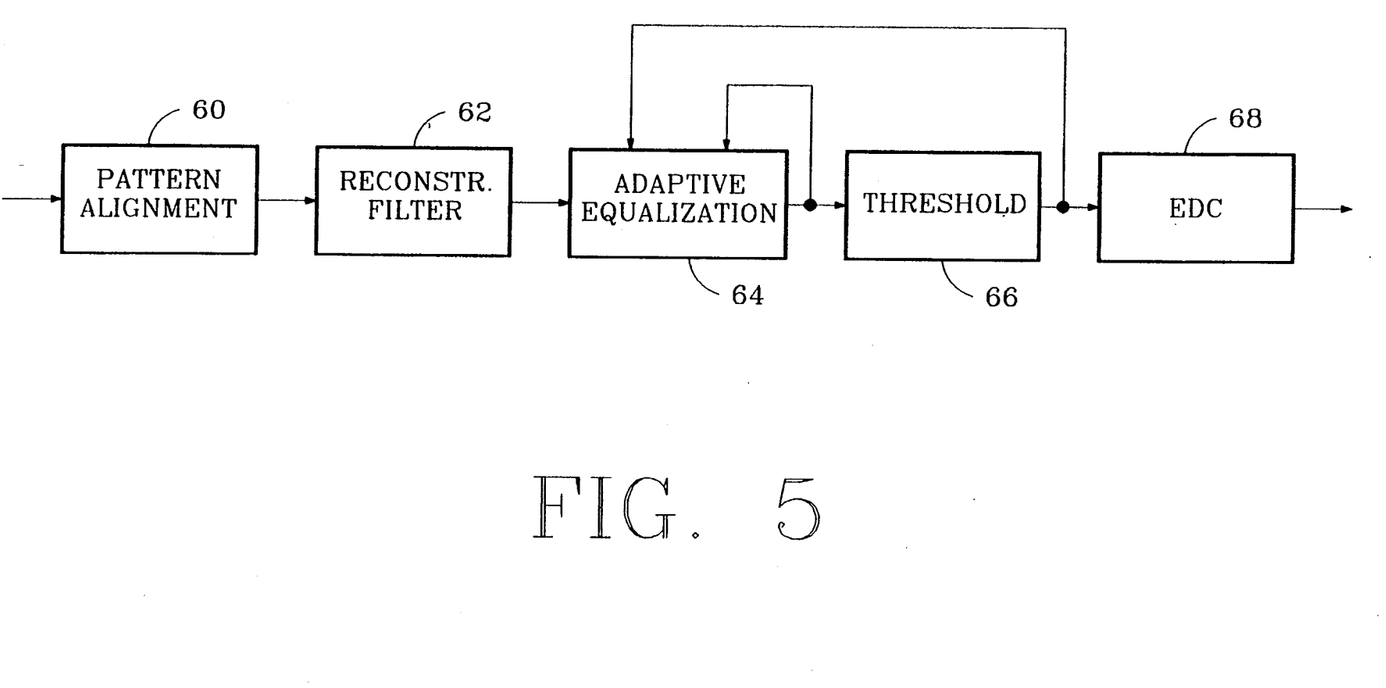
FIG. 5 is a functional block diagram of the Image Processor portion of an apparatus incorporating one aspect of the present invention.

FIG. 5 is a functional block diagram showing the preferred embodiment of the Image Processor 140 which improves the resolution of the image representation stored in the RAM 52 and generates digital information corresponding to the value of the optically encoded information carried by the optical-storage medium. The pattern alignment 60 determines the location of one or more alignment patterns within the image representation and thereby reduces processing requirements by restricting the area within the image representation which must be "upsampled" by the reconstruction filter 62. The adaptive equalization 64 further filters the image representation, reducing the effects of intersymbol interference. The adaptive threshold 66 generates binary data corresponding to the digital information within the image representation; for the preferred embodiment of the optical-storage medium described above, a one is generated in response to each transmissive symbol and a zero is generated in response to each opaque symbol. The error detection/correction (EDC) 68 rectifies correctable errors detected in the binary data.

In one embodiment, the reconstruction filter 62 applies two-dimensional filters to the image representation generated by the Video Processor 120 to improve the resolution of the two-dimensional image representation of the symbols carried by the optical storage medium. The two-dimensional filtering, sometimes referred to herein as "upsampling," is in the nature of reconstruction filtering or image enhancement.

Also in this embodiment, the adaptive equalization 64 reduces intersymbol interference by filtering the upsampled image with adaptive sparse two-dimensional filters, and the adaptive threshold 66 generates in response to the equalized image a binary representation of the symbols. The output of the adaptive equalization 64 and the adaptive threshold 66 is used to adapt the equalization filter coefficients. The adaptive threshold 66 adapts its threshold level in response to statistical characteristics of the output of the adaptive equalization 64.

The processing requirements to perform reconstruction filtering for increasing resolution and to perform equalization filtering for reducing intersymbol interference are inversely related to the amount of oversampling of the symbols. Oversampling at a sufficiently high rate reduces and may eliminate resolution and intersymbol interference problems. In practical systems, depending on the cost and availability of electro-optical and electronic devices, the system designer may be required to balance the amount of oversampling against the processing power required for symbol recovery and image enhancement.

In one embodiment of the present invention, the centers of the symbols define the intersections of a grid formed from the intersection of a set of radial lines passing through the center of the disk and a set of arcs lying along concentric circles centered about the center of the disk. By determining the location of two or more symbols within a field, a set of positional references can be established which can greatly reduce the amount of processing required to determine the location of all other symbols within that field. Although alignment patterns are not required to practice the present invention, the preferred embodiment utilizes alignment patterns in each corner of each symbol block to reduce the amount of processing required to determine the positional references. By determining the precise location of each alignment pattern in the two-dimensional image representation, the expected location of each symbol center in the image representation can be established fairly precisely. Once the symbol centers in the image representation are determined, the light levels transmitted by the symbols at their centers are compared against references or thresholds to determine if a binary one or a binary zero is represented by each symbol in the image representation. In performing these functions, the Image Processor 140 acts on the two-dimensional image representation of the fields generated by the Video Processor 120 in response to the signal received from the Optical Sensor 100.

The Image Processor 140 generates a binary representation of the information carried by the symbols by determining the position of the symbols within the image representation, examining the value of light transmitted by each symbol to determine whether a symbol is reflective or non-reflective, and generating a one or zero in response to a reflective symbol or a non-reflective symbol, respectively.

After the alignment patterns in each of the four corners of a field are located, a grid of positional references may be defined which coincide with the centers all symbols within the field. In practical embodiments, aberrations in the storage medium such as warping can distort the grid. By using four alignment patterns, one pattern in each of four corners of a block of symbols, and linearly interpolating the position of the grid lines between the alignment patterns, the present invention can accommodate any linear distortion.

If the pattern alignment 60 cannot locate a particular alignment pattern, the location of the missing alignment pattern may be estimated relative to the position of other alignment patterns which are located within a given field.

After the position of one or more alignment patterns has been determined, the reconstruction filter 62 increases the resolution of the image representation in the neighborhood of each symbol by applying a two-dimensional interpolating or reconstruction filter to the image at each expected symbol center. It is desirable to determine whether a symbol is reflective or non-reflective by examining the amount of light reflected at the symbol center. Because of the low oversampling rate, in general no sample will have been taken at the symbol center. By using reconstruction filters to increase the resolution of the image, however, it is possible to predict what a sample at a symbol center would have been had it actually been taken.

This prediction is accomplished by a two-dimensional reconstruction filter which upsamples the image representation. A virtual times-four upsampling of the samples is achieved by interpolating a value from the samples in the image representation which are nearest the expected symbol center. Virtual upsampling provides samples close to where the symbol is centered rather than wherever the samples happened to have been taken.

Alternatively, other embodiments may be able to avoid reconstruction filtering by oversampling at a sufficient rate in both the horizontal and vertical dimensions; however, it still may be desirable to provide some filtering in order to smooth the resulting image.

As discussed above, accurate determination of whether a symbol is reflective or non-reflective may be hindered by intersymbol interference. The adaptive equalization 64 performs additional digital filtering or "equalization" which may reduce and ideally may eliminate intersymbol interference.

After the image representation in the RAM 52 has been enhanced by the reconstruction filter 62 and the adaptive equalization 64, the threshold 66 compares the amount of light reflected at or near the symbol centers with a threshold value to determine whether a symbol is reflective or non-reflective. In effect, the threshold 66 translates 8-bit values representing shades of grey within the image representation at the symbol centers into a binary representation. This is done by selecting one or more thresholds and applying them against the 8-bit values. Such thresholds may be dynamically altered to track the reflectivity of the optical disk, the brightness of the illumination, density of the symbols, and other optical variations.

Reconstruction filtering, equalization, and adaptive thresholding do not form part of the present invention, and are not described in detail herein.

The EDC 68 provides for detection and correction of errors sustained during the symbol recovery process. EDC techniques are well known in the art and are not discussed herein.

C. Digital Storage in Video Signals

Storage media for storing video signals, for example, television signals, include laser video disks and magnetic tape such as that used in home video cassette-tape records. The information stored on these media is in the form of an analog signal.

One aspect of the present invention works in cooperation with conventional video storage technologies and apparatuses to store digital information in the video signal. During playback, the digital information is recovered from the media by constructing a two-dimensional image of the symbols representing the digital information in a manner similar to that discussed above for optical media. It is assumed that the apparatuses and media have sufficient bandwidth and signal-to-noise (SNR) to reliably record the symbols used to represent the digital information.

In a home video cassette-tape recorder incorporating a preferred embodiment of the present invention, video-like signals representing binary-valued symbols are inserted into the video stream. For recorders of NTSC television signals, for example, these symbols are recorded in the portion of the signal corresponding to the first 75 and last 75 scan lines of each 525 line picture.

Figure 6:
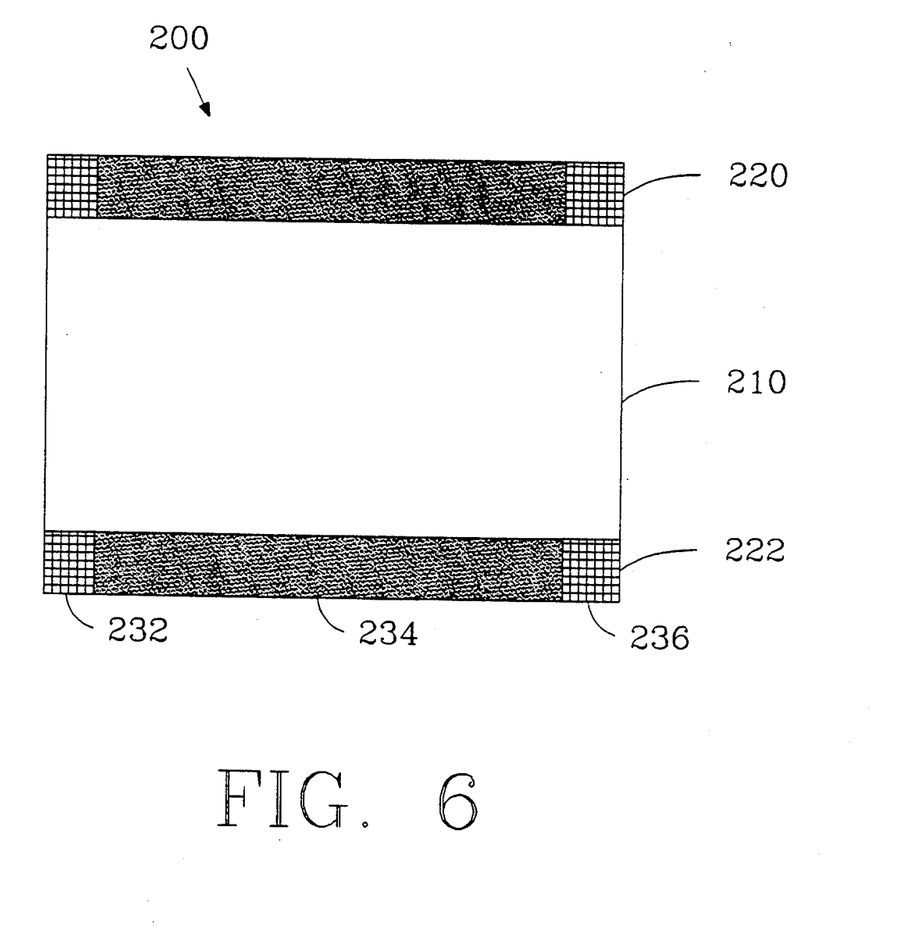
FIG. 6 is an illustration of a television screen showing regions of the picture area corresponding to portions of a video signal used to carry digital information according to one aspect of the present invention.

FIG. 6 illustrates a two-dimensional representation of a single frame of an NTSC television picture 200. The first 75 and last 75 scan lines of each picture frame are represented by regions 220 and 222, respectively. The portion of the frame carrying the picture is represented by area 210. During playback, a video signal producing a border for the first 75 and last 75 scan lines can be transmitted to the television receiver to provide a more acceptable viewing screen.

For simplicity of discussion, the first 75 and last 75 scan lines carrying the digital information are referred to as the "digital scan lines."

Apparatuses used to record and playback the video signal typically introduce considerable jitter into the video signal. The timing of the start of each scan line and the duration of each scan line can fluctuate considerable, therefore recovery of digital information is difficult without some type of correction to the time base of the signal.

The present invention does not require a high degree of time stability in these apparatuses used to record and/or playback the video signals. A signal representing each digital scan line is received and oversampled. The samples for each digital scan line represent a single row of a two-dimensional image which is constructed in RAM. After the two-dimensional image is constructed, time base corrections can be applied: the leading edge of each row in the image can be aligned with one another, and the duration of each row can be established. The location for the center of each symbol is estimated by interpolating within the established length of each row. One-dimensional filtering, or upsampling of each row obtains estimates of sample values at the expected symbol centers.

Alignment patterns or special sequences of symbols may be inserted at the start and end of each digital scan line to assist time base correction, but they are not required. Referring again to FIG. 6, regions 232 and 236 represent alignment patterns at the start and end of each digital scan line, respectively. Region 234 represents the portion of each scan line carrying symbols representing digital information.

We claim:

1. An apparatus for recovering the digital values represented by symbols carried by an information storage medium, said apparatus comprising
   receiving means for receiving a signal representing said symbols, wherein said symbols are carried by said medium in two or more segments, said symbols arranged within said segments according to a pattern having two or more dimensions,
   sampling means for sampling said signal to produce samples, wherein the rate of said sampling is greater than twice the arrival rate of symbol representations in said signal,
   derivation means for deriving from said samples a representation of said symbols, wherein said representation conveys one or more differentiable characteristics intrinsic to said symbols and positions of said symbols within said pattern, and
   recovering means for recovering said digital values in response to said one or more differentiable characteristics and said positions.

2. An apparatus according to claim 1 wherein said derivation means derives an image representation of said symbols.

3. An apparatus according to claim 1 wherein said recovering means derives accurate timing information for said symbols by comparing expected distances with distances established in response to said representation.

4. An apparatus according to claim 1 wherein said sampling means samples said signal at a rate greater than twice the arrival rate of symbol representations in said signal for one or more dimensions of said pattern.

5. An apparatus according to claim 4 wherein said recovering means derives accurate timing information for said symbols by comparing expected distances with distances established in response to said representation.

6. An apparatus according to any one of claims 1 through 5 wherein said segments are arrayed substantially along one or more arcs or substantially along one or more lines.

7. An apparatus according to any one of claims 1 through 5 wherein said receiving means receives said signal representing segments arrayed substantially along one or more arcs or substantially along one or more lines, and wherein said recovering means recovers said digital values in response to said differentiable characteristics which are either optical characteristics or magnetic characteristics.

8. An apparatus according to any one of claims 1 through 5 wherein said information storage medium is in the form of either a disk, a web or a sheet.

9. An apparatus according to any one of claims 1 through 5 wherein said receiving means receives a signal representing segments carried by an information storage medium in the form of a disk, a web or a sheet, and wherein said recovering means recovers said digital values in response to said differentiable characteristics which are either optical characteristics or magnetic characteristics.

10. An information storage medium comprising two or more segments of symbols representing digital values, wherein said symbols are arranged within said segments according to a pattern having two or more dimensions such that said digital values can be established in response to a differentiable characteristic intrinsic to said symbols and positioning of said symbols within said pattern, said segments arranged in one or more tracks.

11. An information storage medium according to claim 10 comprising two or more tracks each comprising one or more of said segments.

12. An information storage medium according to claim 10 or 11 wherein said information storage medium is in the form of a disk, a web or a sheet.

13. An information storage medium according to claim 10 or 11 wherein said differentiable characteristic is either an optical characteristic or a magnetic characteristic.

14. A method for recovering the digital values represented by symbols carried by an information storage medium, said method comprising
   receiving a signal representing said symbols, wherein said symbols are carried by said medium in two or more segments, said symbols arranged within said segments according to a pattern having two or more dimensions,
   sampling said signal to produce samples, wherein the rate of said sampling is greater than twice the arrival rate of symbol representations in said signal,
   deriving from said samples a representation of said symbols, wherein said representation conveys one or more differentiable characteristics intrinsic to said symbols and positions of said symbols within said pattern, and recovering said digital values in response to said one or more differentiable characteristics and said positions.

15. A method according to claim 14 wherein said deriving derives an image representation of said symbols.

16. A method according to claim 14 wherein said recovering derives accurate timing information for said symbols by comparing expected distances with distances established in response to said representation.

17. A method according to claim 14 wherein said sampling samples said signal at a rate greater than twice the arrival rate of symbol representations in said signal for one or more dimensions of said pattern.

18. A method according to claim 17 wherein said recovering derives accurate timing information for said symbols by comparing expected distances with distances established in response to said representation.

19. A method according to any one of claims 14 through 18 wherein said segments are arrayed substantially along one or more arcs or substantially along one or more lines.

20. A method according to any one of claims 14 through 18 wherein said receiving receives said signal representing segments arrayed substantially along one or more arcs or substantially along one or more lines, and wherein said recovering recovers said digital values in response to said differentiable characteristics which are either optical characteristics or magnetic characteristics.

21. A method according to any one of claims 14 through 18 wherein said information storage medium is in the form of either a disk, a web or a sheet.

22. A method according to any one of claims 14 through 18 wherein said receiving receives a signal representing segments carried by an information storage medium in the form of a disk, a web or a sheet, and wherein said recovering recovers said digital values in response to said differentiable characteristics which are either optical characteristics or magnetic characteristics.

* * * * *

UNITED STATES PATENT AND TRADEMARK OFFICE
CERTIFICATE OF CORRECTION

PATENT NO. : 5,347,509
DATED : September 13, 1994
INVENTOR(S) : Paul R. Goldberg, et al.

It is certified that error appears in the above-indentified patent and that said Letters Patent is hereby corrected as shown below:

Column 1, line 6, insert the following paragraph:

--<u>CROSS-REFERENCE TO RELATED APPLICATIONS</u>

This application is a continuation-in-part of copending international patent application No. PCT/US 92/00898 filed February 4, 1992, which designated the United States for filing a national continuation-in-part application of U.S. patent application Serial No. 07/710,174 filed June 4, 1991, now abandoned, which is a continuation-in-part application of U.S. patent application Serial No. 07/650,571 filed February 4, 1991, now abandoned.--

Signed and Sealed this

Twenty-seventh Day of December, 1994

*Attest:*

BRUCE LEHMAN

*Attesting Officer*     *Commissioner of Patents and Trademarks*